US012257842B2

(12) United States Patent
Ishida et al.

(10) Patent No.: US 12,257,842 B2
(45) Date of Patent: Mar. 25, 2025

(54) LIQUID DISCHARGE APPARATUS, IMPRINT APPARATUS, AND CLEANING METHOD

(71) Applicant: CANON KABUSHIKI KAISHA, Tokyo (JP)

(72) Inventors: Masaki Ishida, Tochigi (JP); Noriyasu Hasegawa, Tochigi (JP); Moena Oku, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 174 days.

(21) Appl. No.: 18/074,131

(22) Filed: Dec. 2, 2022

(65) Prior Publication Data

US 2023/0182473 A1 Jun. 15, 2023

(30) Foreign Application Priority Data

Dec. 15, 2021 (JP) ................................ 2021-203603

(51) Int. Cl.
*B41J 2/165* (2006.01)

(52) U.S. Cl.
CPC ....... *B41J 2/16552* (2013.01); *B41J 2/16505* (2013.01)

(58) Field of Classification Search
CPC .................................................... B41J 2/16552
See application file for complete search history.

(56) References Cited

U.S. PATENT DOCUMENTS

| | | | | |
|---|---|---|---|---|
| 2003/0058301 A1* | 3/2003 | Sekiya | ................. | B41J 2/16508 347/29 |
| 2009/0147043 A1* | 6/2009 | McAvoy | .............. | B41J 2/16505 347/32 |
| 2020/0047506 A1 | 2/2020 | Iimura et al. | ........ | B41J 2/16517 |
| 2020/0341371 A1 | 10/2020 | Iwasaki et al. | ........... | G03F 7/00 |

FOREIGN PATENT DOCUMENTS

| | | | | |
|---|---|---|---|---|
| JP | 2005028758 A * | 2/2005 | | |
| JP | 2008201021 A * | 9/2008 | .......... | B41J 2/16508 |
| JP | 2020-026129 | 2/2020 | | |
| WO | WO-2010004990 A1 * | 1/2010 | .......... | B41J 2/16535 |

OTHER PUBLICATIONS

English translation of JP2008201021A, retrieved via FIT database on Jul. 19, 2024.*
English translation of JP2005028758, retreieved via FIT databased on Jul. 19, 2024.*

* cited by examiner

*Primary Examiner* — Shelby L Fidler
(74) *Attorney, Agent, or Firm* — Venable LLP

(57) ABSTRACT

A liquid discharge apparatus includes a discharge head including a discharge surface formed with a plurality of discharge openings from which a liquid is discharged, a cap configured to be detachably attached to the discharge head and form a holding space for a cleaning liquid such that the cleaning liquid contacts the discharge surface, a supply portion configured to connect to the cap and to supply the cleaning liquid to the holding space, and an outlet portion configured to connect to the cap and to drain the cleaning liquid from the holding space. The supply portion is formed at a position facing the discharge surface. The outlet portion is formed at a position outside the supply portion in an inside-outside direction of the discharge surface.

18 Claims, 9 Drawing Sheets

LIQUID DISCHARGE APPARATUS, IMPRINT APPARATUS, AND CLEANING METHOD

BACKGROUND OF THE INVENTION

Field of the Invention

The present invention relates to a cleaning technique for a discharge opening from which a liquid is discharged.

Description of the Related Art

A so-called imprint technique has been known as the technique applied to the manufacturing process of a semiconductor device or the like. In the imprint technique, for example, a mold formed with a pattern is brought into contact with an imprint material on a substrate, and the pattern is formed in the imprint material by transferring the shape of the mold thereto. A liquid discharge apparatus that discharges the imprint material onto the substrate includes a discharge head including a discharge surface formed with a plurality of discharge openings from which the imprint material is discharged. There has been proposed a technique of cleaning the discharge opening with a cleaning liquid to maintain the discharge performance of the discharge opening (for example, Japanese Patent Laid-Open No. 2020-26129).

With the method of cleaning the discharge opening with the cleaning liquid, a substance existing around the discharge surface may mix into the cleaning liquid and adversely affect the discharge opening (secondary pollution).

SUMMARY OF THE INVENTION

The present invention provides a technique for suppressing that a substance existing around a discharge surface mixes into a cleaning liquid and adversely affects a discharge opening.

According to an aspect of the present invention, there is provided a liquid discharge apparatus comprising a discharge head including a discharge surface formed with a plurality of discharge openings from which a liquid is discharged, a cap configured to be detachably attached to the discharge head and form a holding space for a cleaning liquid such that the cleaning liquid contacts the discharge surface, a supply portion configured to connect to the cap and to supply the cleaning liquid to the holding space, and an outlet portion configured to connect to the cap and to drain the cleaning liquid from the holding space, wherein the supply portion is formed at a position facing the discharge surface, and the outlet portion is formed at a position outside the supply portion in an inside-outside direction of the discharge surface.

Further features of the present invention will become apparent from the following description of exemplary embodiments (with reference to the attached drawings).

DESCRIPTION OF THE EMBODIMENTS

Figure 1:
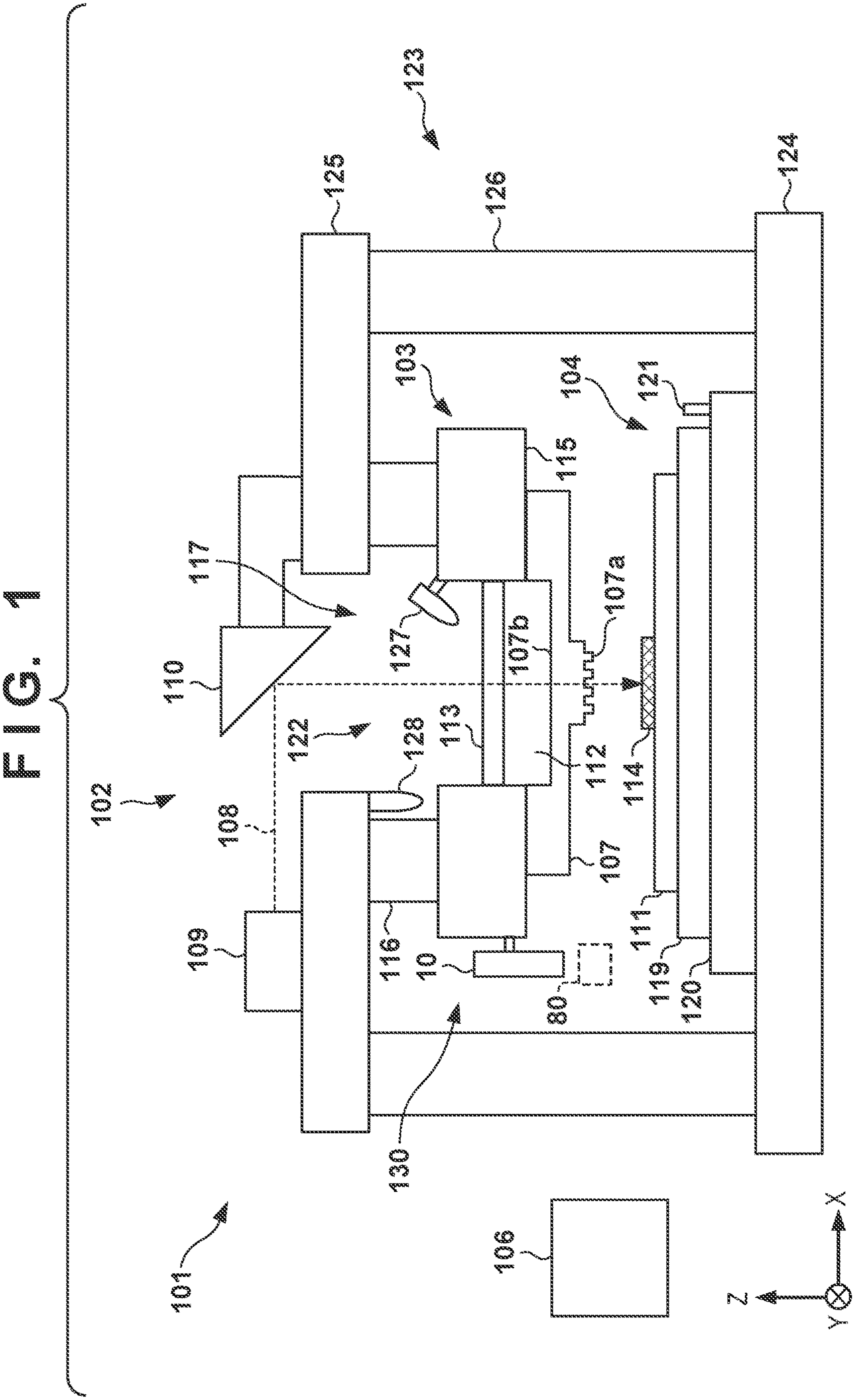
FIG. 1 is a schematic view showing the arrangement of an imprint apparatus.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

<Outline of Imprint Apparatus>

FIG. 1 is a schematic view showing the arrangement of an imprint apparatus 101 according to an embodiment of the preset invention. In FIG. 1, an arrow Z indicates the vertical direction, and arrows X and Y indicate the horizontal directions orthogonal to each other. The imprint apparatus 101 is used in manufacturing various kinds of devices such as a semiconductor device. The imprint apparatus 101 includes a liquid discharge apparatus 130. The liquid discharge apparatus 130 includes a liquid discharge unit 10 and a cleaning unit 80. The liquid discharge unit 10 discharges a liquid (in this embodiment, a resist) 114 onto a substrate 111. The liquid 114 is, for example, a light curable resin having a property of being cured by receiving ultraviolet light (UV). The liquid 114 is appropriately selected in accordance with various kinds of conditions for a semiconductor device manufacturing process and the like. In addition to the light curable resist, for example, a thermosetting resist may be used as the liquid, and the imprint apparatus may be an apparatus that performs an imprint process by curing the resist with heat. The liquid 114 may be referred to as a discharge material or an imprint material. The cleaning unit 80 is used to clean the liquid discharge unit 10.

The imprint apparatus 101 also includes a light irradiation unit 102, a mold holding mechanism 103, a substrate stage 104, a control unit 106, a measurement unit 122, and a housing 123.

The light irradiation unit 102 includes a light source 109, and an optical element 110 for correcting ultraviolet light 108 emitted from the light source 109. The light source 109 is, for example, a halogen lamp that generates an i-line or a g-line. The ultraviolet light 108 is applied to the liquid 114 via a mold 107. The wavelength of the ultraviolet light 108 is a wavelength corresponding to the liquid 114 to be cured. Note that in a case of an imprint apparatus that uses a thermosetting resist as the resist, a heat source unit for curing the thermosetting resist is installed in place of the light irradiation unit 102.

The mold holding mechanism 103 includes a mold chuck 115 and a mold driving mechanism 116. The mold 107 held by the mold holding mechanism 103 includes a pattern portion 107$a$ which has a rectangular outer peripheral shape and in which a three-dimensional concave-convex pattern such as a circuit pattern to be transferred is formed on the surface facing the substrate 111. The material of the mold 107 in this embodiment is a material capable of transmitting the ultraviolet light 108 and, for example, quartz is used. The mold chuck 115 holds the mold 107 by vacuum chuck or an electrostatic force.

The mold driving mechanism 116 moves the mold 107 by holding and moving the mold chuck 115. The mold driving mechanism 116 can press the mold 107 against the liquid 114 by moving the mold 107 downward in the Z direction. Further, the mold driving mechanism 116 can separate the mold 107 from the liquid 114 by moving the mold 107 upward in the Z direction. An example of an actuator that can be employed as the mold driving mechanism 116 is, for example, a linear motor or an air cylinder.

Each of the mold chuck 115 and the mold driving mechanism 116 includes an opening region 117 in the central portion. The mold 107 includes a concave-shaped cavity 107$b$ in the surface to be irradiated with the ultraviolet light 108. A light transmitting member 113 is provided in the opening region 117 of the mold driving mechanism 116, thereby forming a sealed space 112 surrounded by the light transmitting member 113, the cavity 107$b$, and the opening region 117.

The pressure in the space 112 is controlled by a pressure correction apparatus (not shown). When the pressure correction apparatus sets the pressure in the space 112 higher than the outside, the pattern portion 107$a$ is bent in a convex shape toward the substrate 111. With this, the central portion of the pattern portion 107$a$ is brought into contact with the liquid 114. Accordingly, when the mold 107 is pressed against the liquid 114, it is suppressed that a gas (air) is trapped between the pattern portion 107$a$ and the liquid 114. Thus, the liquid 114 can be filled to every corner of the concave-convex portion of the pattern portion 107$a$. The depth of the cavity 107$b$ that determines the size of the space 112 is appropriately changed in accordance with the size or material of the mold 107.

The substrate stage 104 includes a substrate chuck 119, a substrate stage housing 120, and a stage reference mark 121. The substrate 111 held by the substrate stage is a single-crystal silicon substrate or a Silicon on Insulator (SOI) substrate. The liquid 114 is discharged onto the processed surface of the substrate 111, and the pattern is molded thereon.

The substrate chuck 119 holds the substrate 111 by vacuum chuck. The substrate stage housing 120 moves the substrate 111 by moving the substrate chuck 119 in the X direction and the Y direction while holding the substrate chuck 119 by a mechanical means. The stage reference mark 121 is used in alignment between the substrate 111 and the mold 107 to set a reference position of the substrate 111. For example, a linear motor is used as an actuator of the substrate stage housing 120. In addition, the actuator of the substrate stage housing 120 may be configured to include a plurality of driving systems such as a coarse driving system or a fine driving system.

The measurement unit 122 includes an alignment measuring device 127 and an observation measuring device 128. The alignment measuring device 127 measures the positional shift in the X direction and the Y direction between an alignment mark formed on the substrate 111 and an alignment mark formed in the mold 107. The observation measuring device 128 is, for example, an image capturing apparatus such as a CCD camera. The observation measuring device 128 captures an image of the pattern of the liquid 114 discharged onto the substrate 111, and outputs it to the control unit 106 as image information.

The control unit 106 controls operations of respective components of the imprint apparatus 101, and the like. Particularly, the control unit 106 also controls the liquid discharge apparatus 130. The control unit 106 is formed by, for example, a computer including a CPU, a ROM, and a RAM. The control unit 106 is connected to the respective components of the imprint apparatus 101 via lines, and the CPU controls the respective components in accordance with control programs stored in the ROM. Further, the control unit 106 includes a display unit and can perform various kinds of display. Based on the measurement information of the measurement unit 122, the control unit 106 controls the operations of the mold holding mechanism 103, the substrate stage 104, and the liquid discharge unit 10.

The housing 123 includes a base plate 124 on which the substrate stage 104 is placed, a bridge plate 125 to which the mold holding mechanism 103 is fixed, and columns 126 extending from the base plate 124 and supporting the bridge plate 125. The imprint apparatus 101 further includes a mold conveying mechanism (not shown) that conveys the mold 107 from the outside of the apparatus to the mold holding mechanism 103, and a substrate conveying mechanism (not shown) that conveys the substrate 111 from the outside of the apparatus to the substrate stage 104.

The imprint apparatus 101 performs an imprint process including a series of following processing operations. First, the imprint apparatus 101 causes the liquid discharge unit 10 to discharge the liquid 114 onto the substrate 111. Then, the imprint apparatus 101 presses the mold 107 including a mold pattern against the liquid 114 discharged onto the substrate and, in this state, cures the liquid 114 by irradiation of light (ultraviolet light). Thereafter, the mold 107 is separated from the cured liquid 114. Thus, the pattern of the mold 107 is transferred onto the substrate 111.

<Liquid Discharge Unit>

Figure 2:
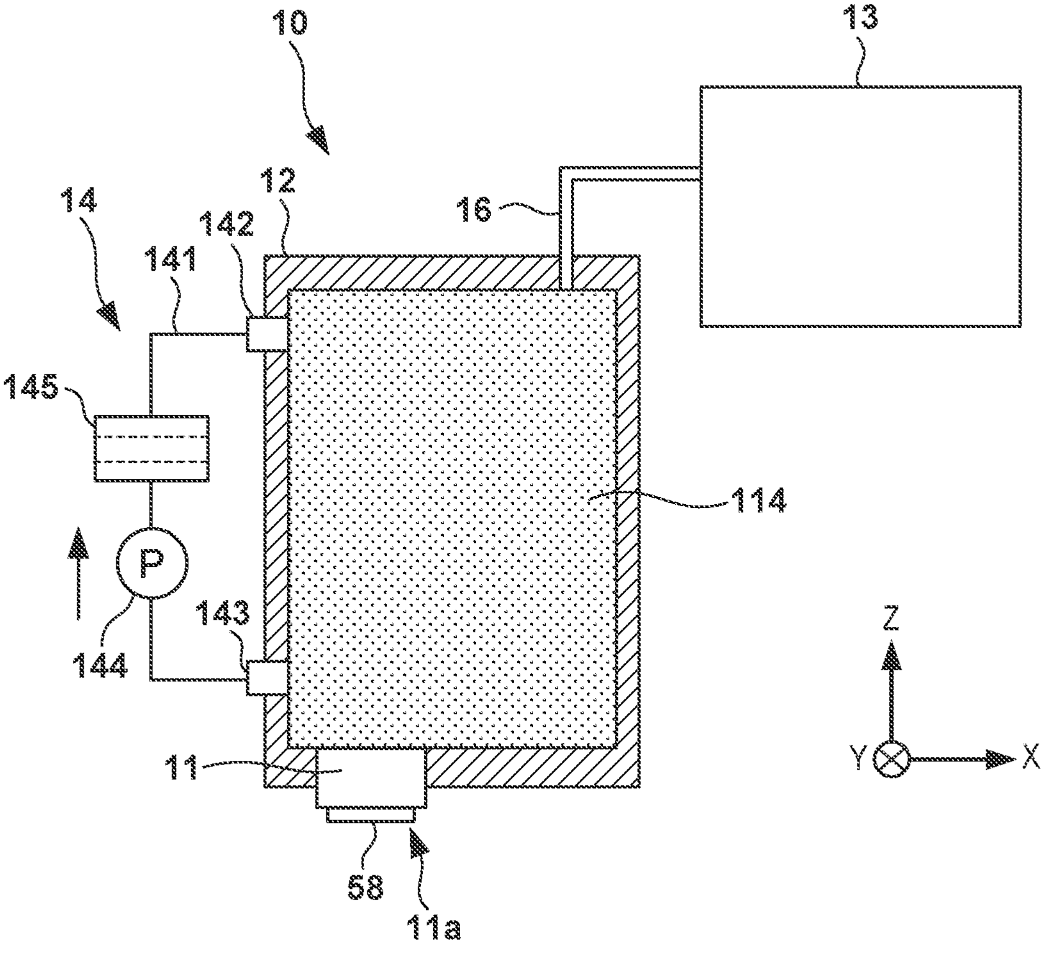
FIG. 2 is a view showing the arrangement of a liquid discharge unit.

FIG. 2 is a view showing the arrangement of the liquid discharge unit 10. The liquid discharge unit 10 includes a discharge head 11, a container 12, a pressure control unit 13, and a circulation unit 14. The container 12 contains the liquid 114. The internal space of the container 12 communicates with the pressure control unit 13 by a pipe 16. The pressure control unit 13 includes a tank for containing a filling liquid, a pressure sensor, a valve for opening/closing the connection pipe 16, and the like, and is configured to be capable of controlling the pressure in the internal space of the container 12. By controlling the pressure of the liquid in the internal space of the container 12 by the pressure control unit 13, the liquid discharge reproducibility can be improved.

Note that in this embodiment, the internal space of the container 12 is formed as one space and the pressure therein is controlled by the pressure control unit 13, but the internal space may be divided into two spaces by a separation film. In this case, one space communicates with the discharge head 11, the other space communicates with the pressure control unit 13 via the pipe 16, and the pressure of the liquid is controlled via the separation film.

The circulation unit 14 includes a flow passage (pipe) 141, and connectors 142 and 143 that communicate the both end portions of the flow passage 141 with the internal space of the container 12. A pump 144 and a filter 145 are provided on the flow passage 141. The liquid 114 in the container 12 can be circulated via the flow passage 141 by driving the pump 144. A foreign substance is removed by the filter 145 while the liquid 114 passes through the flow passage 141. The filter 145 is arranged on the downstream side of the pump 144 in the flow direction of the liquid 114. Even if dust from the pump 144 mixes into the liquid, it is removed by the filter 144.

Figure 3:
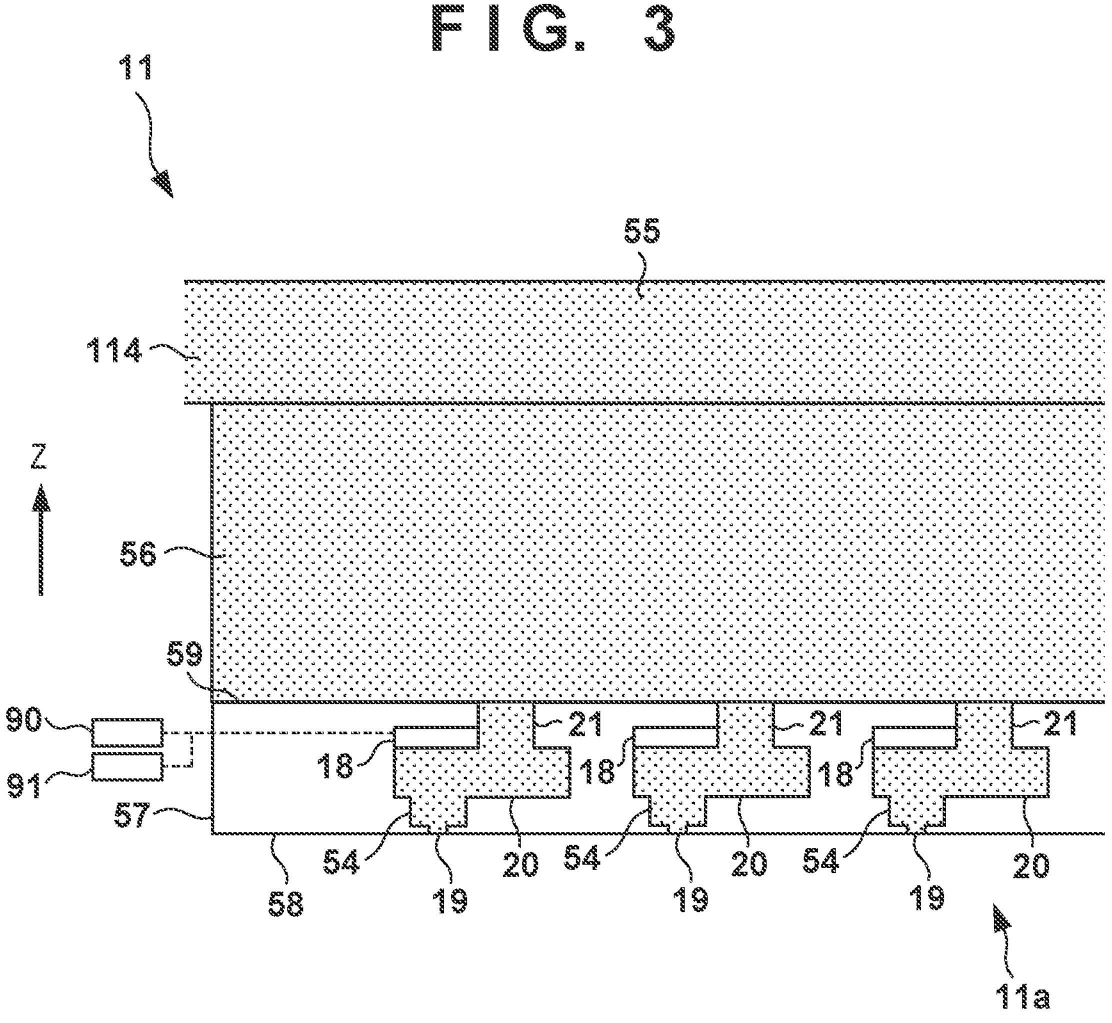
FIG. 3 is a partially enlarged sectional view of a discharge head.

The discharge head 11 discharges the liquid 114 from a bottom surface 11*a*. FIG. 3 is a partially enlarged sectional view of the discharge head 11. The discharge head 11 includes a common liquid chamber 56 and a module board 57. The module board 57 includes a plurality of nozzles 54. Each nozzle 54 includes a supply opening 21 which opens in an upper surface 59 and from which the liquid 114 is taken in, and a discharge opening 19 from which the liquid 114 is discharged. The module board 57 includes a discharge surface 58, and each discharge opening 19 opens in the discharge surface 58. An energy element 18 that generates the energy for discharging the liquid 114 is provided in each nozzle 54. The opening area of the discharge opening 19 is smaller than the opening area of the supply opening 21, and the discharge opening 19 has the smallest sectional area in the flow passage in the discharge nozzle 54. In this embodiment, the energy element 18 is a piezoelectric element represented by a piezoelectric element, but a heating resistor can also be used in accordance with the kind of the liquid 114. In addition, it is also possible to employ a configuration in which supplying the liquid and stopping the supply thereof are controlled using a control valve or the like.

The supply opening 21 communicates with the discharge opening 19 via a small liquid chamber 20 in the module board 57. Driving of the energy element 18 is controlled by the control unit 106 via a driving circuit 90. When the volume of the small liquid chamber 20 is changed by the energy element 18, the liquid 114 in the small liquid chamber 20 is discharged from the discharge opening 19. The discharge head 11 may have the arrangement similar to that of an ink discharge head used for an inkjet printer.

The discharge head 11 is open to the atmosphere through the discharge opening 19. However, since the diameter of the discharge opening 19 is several μm to ten-odd a capillary action prevents the liquid 114 from leaking due to its own weight. The liquid surface in the vicinity of the discharge opening 19 is held in a concave shape, which is a so-called meniscus state. When the internal pressure of the liquid 114 in the small liquid chamber 20 is held at a negative pressure of −0.1 Pa to −1,000 Pa by the pressure control unit 13, the meniscus state can be stably held. Liquid repellent treatment has been applied to the discharge surface 58 to reliably prevent the liquid 114 from leaking from the discharge opening 19. An example of the liquid repellent treatment is applying a fluorine containing compound to the discharge surface 58 in the form of a film.

When the diameter of the discharge opening 19 is a small diameter ranging from several μm to tem-odd if a particle attaches to the inside of the discharge opening 19 or some ingredients contained in the liquid 114 dry and solidify around the discharge opening 19, the discharge performance deteriorates. Examples of deterioration of the discharge performance are fluctuations in discharge amount and discharge direction in addition to non-discharge. If the discharge performance deteriorates as described above, the discharge opening 19 is cleaned by the cleaning unit 80.

<Detection of Liquid Discharge State>

The energy element 18 can also be used to detect the liquid discharge state of the discharge opening 19. The energy element 18 is driven with a voltage 30% to 70% of the voltage applied upon discharging the liquid 114 so as to fluctuate the volume of the small liquid chamber 20 (to be referred to as inspection oscillation hereinafter) and vibrate the liquid 114 in the small liquid chamber 20. For example, if a driving pulse of ±10 V is applied to the energy element 18 upon discharging the liquid 114 from the discharge opening 19, a driving pulse of ±6 V is applied to the energy element 18. In other words, the liquid 114 in the small liquid chamber 20 is vibrated by driving the energy element 18 to such an extent that the meniscus of the discharge opening 19 is not broken and the liquid 114 is not discharged.

Even after driving of the energy element 18 is stopped, a counter electromotive force is generated in the energy element 18 due to a residual vibration of the liquid 114. The counter electromotive force is detected by a sensor 91 provided for each discharge opening 19. The sensor 91 is, for example, a voltage sensor or a current sensor. If the discharge opening 19 is blocked by a contaminant or a bubble has entered in the small liquid chamber 20, the waveform of the counter electromotive force is different from the waveform in the standard state (the waveform during the meniscus is formed). That is, the energy element 18 outputs a signal corresponding to the liquid discharge state of the corresponding discharge opening 19. Based on the signal, the liquid discharge state of each discharge opening 19 can be individually detected.

Note that an example in which the liquid discharge state is detected by inspection oscillation of the energy element 18 has been described here, but the liquid discharge state of each discharge opening 19 may be individually detected by measuring the presence/absence of a drop landing and the drop landing position/speed/amount by a drop inspection apparatus (not shown).

The liquid discharge state is detected when the liquid discharge unit 10 is located at a standby position for maintenance. If an abnormality of the liquid discharge state, such as clogging, of each discharge opening 19 is detected, a cleaning process is performed.

<Cleaning Unit>

Figure 4:
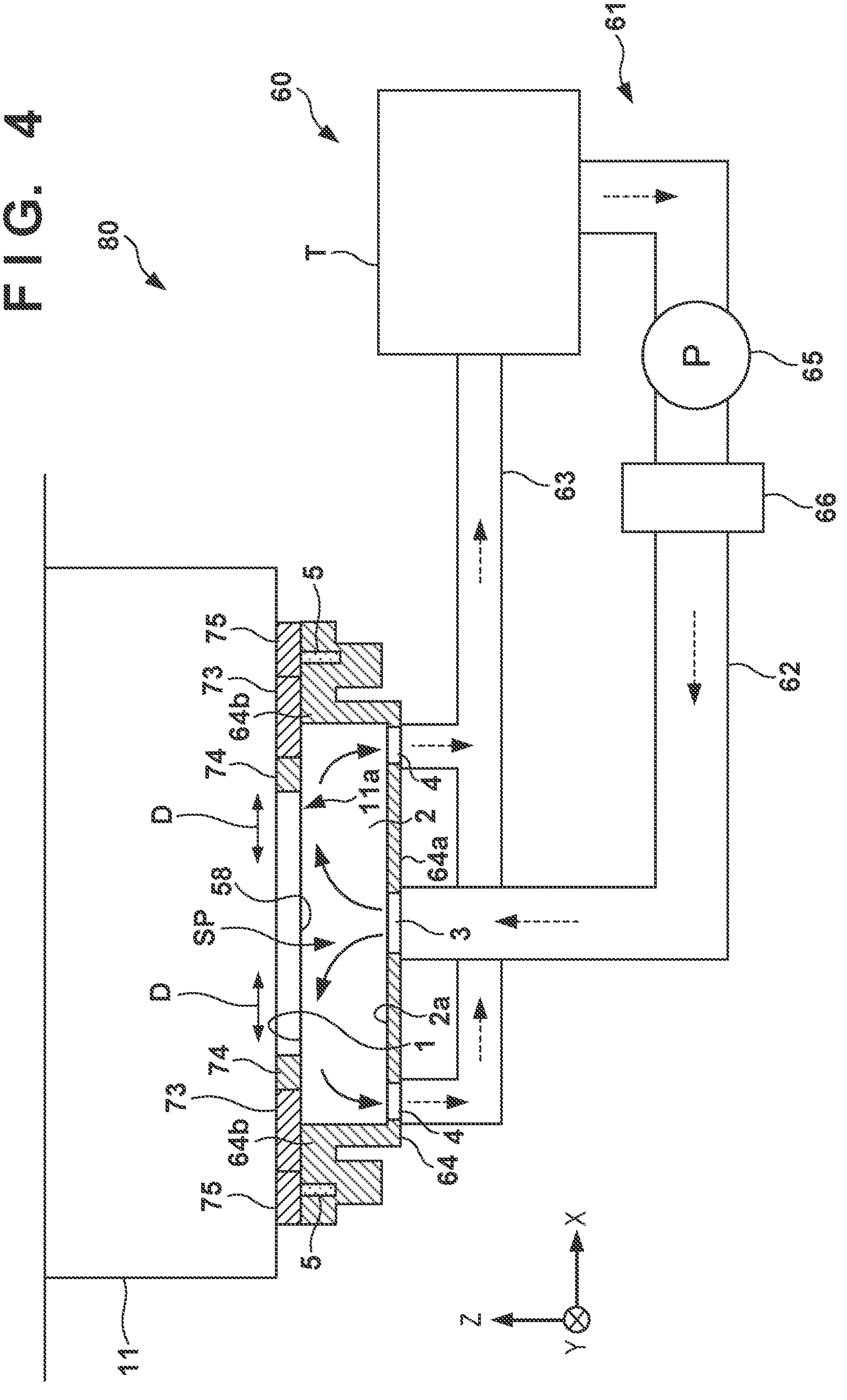
FIG. 4 is a view showing the arrangement of a cleaning apparatus.

FIG. 4 is a view for explaining the arrangement of a cleaning apparatus 60 provided in the cleaning unit 80, and illustrates a cleaning mode for the discharge surface 58 of the discharge head 11. The cleaning apparatus 60 is an apparatus that cleans each discharge opening 19 with a cleaning liquid, and includes a circulation apparatus 61, a cap 64, and a filter 66. The cleaning liquid is, for example, a liquid similar to the liquid 114, or a liquid using one of the materials contained in the liquid 114. A plurality of kinds of cleaning liquids may be used for one cleaning process. For example, after the cleaning using, as the cleaning liquid, a liquid different from the liquid 114 is performed, the cleaning using the liquid 114 as the cleaning liquid may be performed.

The cap 64 is detachably attached to the discharge head 11. The circulation apparatus 61 is a mechanism for circulating the cleaning liquid supplied to and drained from the cap 64. The filter 66 is provided in the middle of the circulation path of the cleaning liquid to purify the cleaning liquid. By circulating the cleaning liquid, the consumed amount of the cleaning liquid can be reduced. Note that this embodiment adopts the configuration in which the cleaning liquid is circulated, but a configuration in which the cleaning liquid is not circulated but consumed for each cleaning may be adopted.

The circulation apparatus 61 includes a tank T for storing the cleaning liquid, pipes 62 and 63, and a pump 65. The pipe 62 connects the tank T and the cap 64, thereby forming the supply-side flow passage of the cleaning liquid. The pipe 63 connects the tank T and the cap 64, thereby forming the drain-side (collection-side) flow passage of the cleaning liquid. In this embodiment, the pump 65 is provided in the middle of the pipe 62, and pumps the cleaning liquid to the cap 64. The filter 66 is provided in the middle of the pipe 62 on the downstream side of the pump 65, and purifies the cleaning liquid flowing in the pipe 62. Even if dust from the pump 65 mixes into the cleaning liquid, it is removed by the filter 66.

Figure 5A:
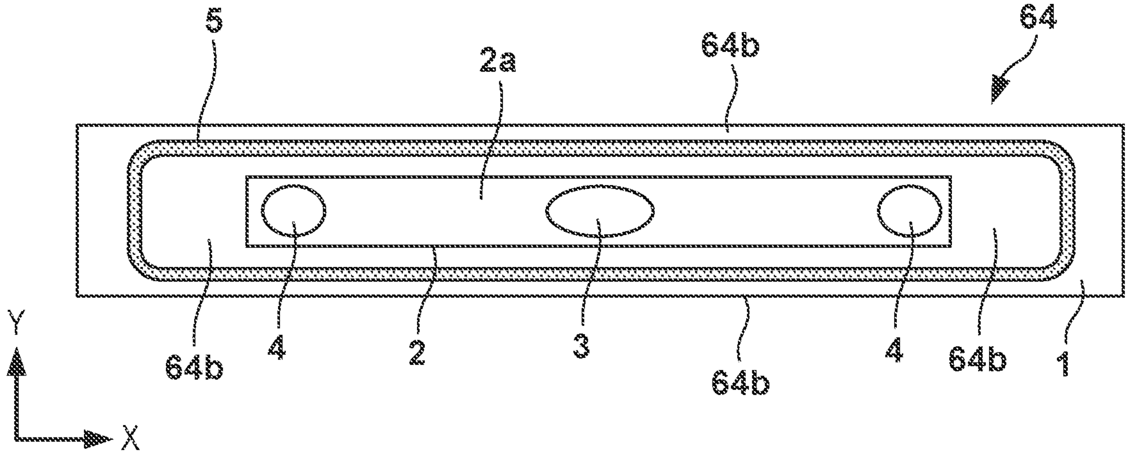
FIG. 5A is a plan view of a cap.
Figure 5B:
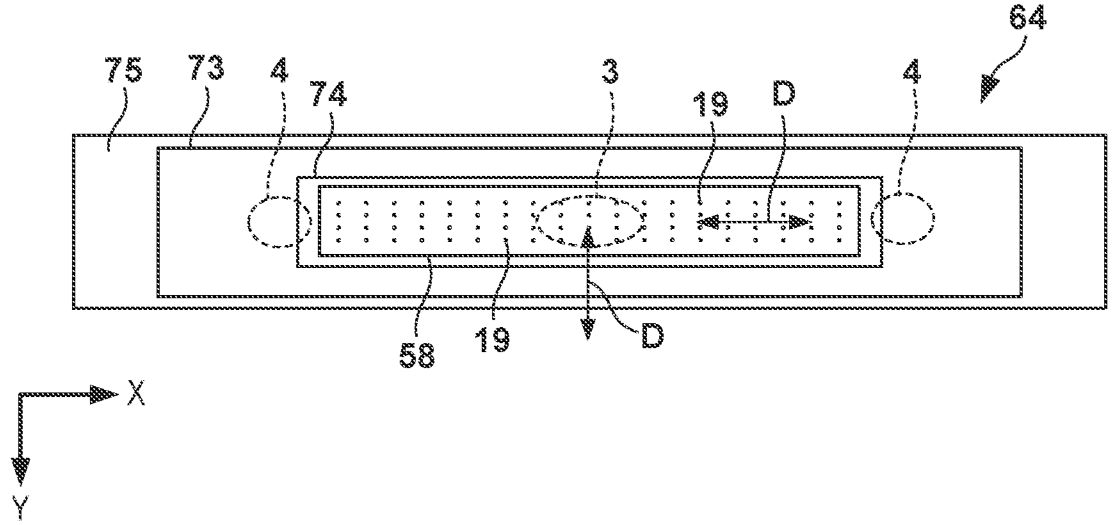
FIG. 5B is a bottom view of a discharge head.

With reference to FIGS. 5A and 5B in addition to FIG. 4, the structure of the cap 64 and the structure of the bottom surface of the discharge head 11 will be described. A tile 75 is provided in the bottom surface 11*a* of the discharge head 11. The tile 75 holds the discharge surface 58 formed with the plurality of discharge openings 19, a protection member 73 that protects the discharge surface 58, and a filling agent 74 that fills the gap between the discharge surface 58 and the protection member 73. The discharge surface 58 has a rectangular shape having long sides in the X direction and short sides in the Y direction. An arrow D in each drawing indicates the inside-outside direction (in this embodiment, the central portion-peripheral portion direction of the rectangle on the X-Y plane) of the discharge surface 58.

The cap 64 is a member that forms a holding space SP for the cleaning liquid such that the cleaning liquid contacts the discharge surface 58. The cap 64 is, for example, a cut part made of a PTFE resin having no possibility of metal elution. By performing acid cleaning on the processed and molded cap 64, it is possible to use the cap 64 in a physically and chemically clean state.

The cap 64 has a shape surrounding the discharge surface 58. In this embodiment, the cap 64 has a rectangular parallelepiped shape as a whole. The cap 64 includes a rectangular bottom portion 64*a* and four side portions 64*b* standing from the bottom surface 64*a*. The top of the cap 64 is open.

The cap 64 includes a facing surface (upper surface) 1 facing the bottom surface 11*a* of the discharge head 11. A rectangular parallelepiped groove 2, which defines the holding space SP, is formed in the facing surface 1. Further, an O-ring type seal member 5 is provided on the facing surface 1 so as to surround the groove 2. The cap 64 is attached such that the facing surface 1 contacts the bottom surface 11*a* of the discharge head 11, and the seal member 5 is pressed against the tile 75, thereby preventing the cleaning liquid in the holding space SP from leaking to the outside of the cap 64. Regarding the attachment of the cap 64 to the discharge head 11, the cap 64 may be fixed to the discharge head 11 using screw holes (not shown) provided in the tile 75.

In the state in which the cap 64 is attached to the discharge head 11, the holding space SP covers the entire discharge surface 58. That is, all the discharge openings 19 are covered by the holding space SP. All the discharge openings 19 can be cleaned by filling the holding space SP with the cleaning liquid.

The pressure (P1) of the cleaning liquid pumped to the holding space SP can be measured by a pressure gauge (not shown) included in the pump 65. By controlling the pressure (P2) in the discharge head 11 by the pressure control unit 13, the magnitude relationship between the pressure P1 and the pressure P2 can be controlled.

A supply portion 3 and a plurality of outlet portions 4 are formed in a bottom wall surface 2*a* of the groove 2. In this embodiment, each of the supply portion 3 and the plurality of outlet portions 4 is an opening (hole) which is open in the bottom wall surface 2*a* and extends through the bottom portion 64*a* of the cap 64. The supply portion 3 is connected to the pipe 62, and the plurality of outlet portions 4 are connected to the pipe 63. The cleaning liquid pumped from the pump 65 is supplied to the holding space SP via the supply portion 3, and drained from the holding space SP via the plurality of outlet portions 4.

In FIG. 5B, the position of each of the supply portion 3 and the plurality of outlet portions 4 with respect to the discharge surface 58 in the state in which the cap 64 is attached to the discharge head 11 is shown with a dashed line. The supply portion 3 is formed at a position facing the discharge surface 58. Particularly, in the example shown in FIG. 5B, the supply portion 3 is formed at a position facing the central portion of the discharge surface 58 in the X direction and the Y direction. On the other hand, each outlet portion 4 is formed at a position outside the supply portion 3 in the inside-outside direction D of the discharge surface 58.

With the arrangement described above, the cleaning liquid in the holding space SP flows from the supply portion 3 to the outlet portions 4 as indicated by arrows in FIG. 4. Since the cleaning liquid flows from the inside to the outside on the discharge surface 58, it is suppressed that the cleaning liquid flows from the outside to the inside. Accordingly, it is prevented that contaminants adhering to the protection member 73 and the filling agent 74 flow together with the cleaning liquid and adhere to the discharge surface 58, and that the cleaning liquid contaminated during cleaning remains on the discharge surface 58. In this manner, according to this embodiment, it can be suppressed that a substance existing around the discharge surface 58 mixes into the cleaning liquid and adversely affects the discharge opening 19.

In this embodiment, the supply portion 3 is an opening narrower than the Y-direction width of the discharge surface 58, so that the cleaning liquid supplied from the supply portion 3 to the holding space SP radially flows outward on the discharge surface 58. It is possible to increase the cleaning effect of each discharge opening 19, and effectively suppress that the cleaning liquid flows from the outside to the inside on the discharge surface 58. In addition, it is possible to suppress that the cleaning liquid supplied from the supply portion 3 to the holding space SP directly flows to the components (the protection member 73 and the filling agent 74) outside the discharge surface 58.

In this embodiment, two outlet portions 4 are spaced apart from each other in the X direction, and the supply portion 3 is located at a position between the two outlet portions 4, particularly, at the middle position therebetween. The cleaning liquid can be promoted to flow from the supply portion 3 toward each outlet portion 4, so that it is possible to effectively suppress that the cleaning liquid flows from the outside to the inside of the discharge surface 58. Particularly, in this embodiment, each outlet portion 4 is formed at a position not facing the discharge surface 58. In other words, each outlet portion 4 is formed outside the discharge surface 58. With this arrangement, it is possible to further effectively suppress that the cleaning liquid flows from the outside to the inside of the discharge surface 58.

<Example of Cleaning Control>

Figure 6:
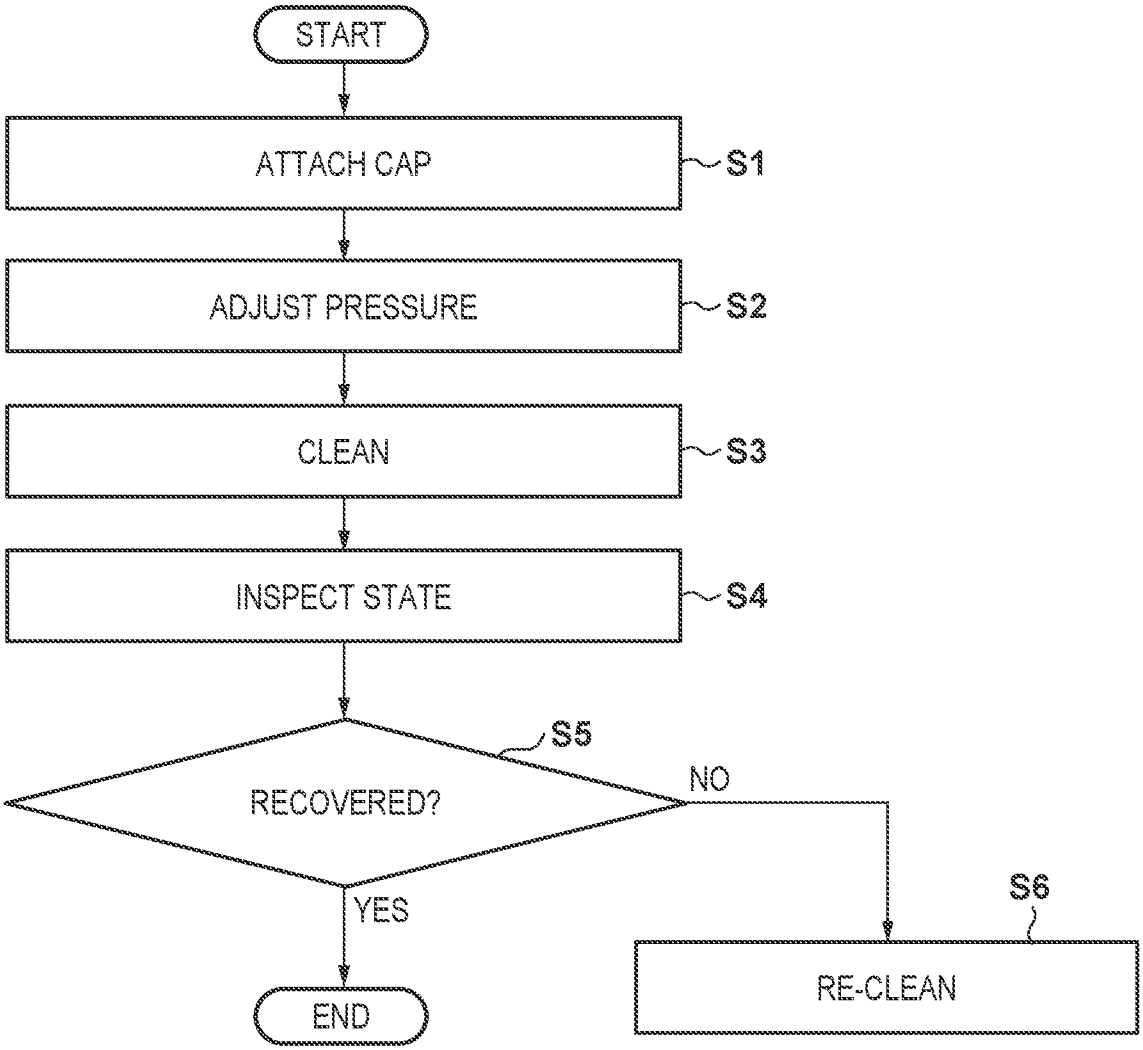
FIG. 6 is a flowchart of a cleaning process.

An example of the cleaning procedure of the discharge opening 19 by the cleaning apparatus 60 will be described with reference to FIG. 6. First, in step S1, the cap 64 is attached to the discharge head 11. As shown in FIG. 4, the cap 64 is arranged at the position facing the discharge surface 58, and the cap 64 is attached to the discharge head 11 such that the facing surface 1 of the cap 64 abuts against the bottom surface 11*a* of the discharge head 11.

In step S2, the pressure P2 is adjusted to a positive pressure by the pressure control unit 13. When the pressure P1 is increased by driving the pump 65, the cleaning liquid may flow backward from the holding space SP into the discharge opening 19. To prevent this, the pressure P2 is adjusted in advance so that the relationship expressed by the pressure P2>the pressure P1 is achieved when the pump 65 is driven.

In step S3, the pump 65 is driven to supply the cleaning liquid to the holding space SP. Each discharge opening 19 is cleaned with the cleaning liquid. The cleaning liquid is circulated between the cap 64 and the tank T via the supply portion 3 and the plurality of outlet portions 4. Since the cleaning liquid is purified by the filter 66, even when the cleaning is performed for a long time, the consumed amount of the cleaning liquid can be suppressed.

Each energy element 18 may be driven during the cleaning. The cleaning effect can be improved by vibrating the cleaning liquid in the nozzle 54 and the cleaning liquid in the holding space SP by driving the energy element 18. The normal conditions for the cleaning by vibration may be the same as the voltage and frequency in the normal discharge operation. If the adhered contaminants cannot be removed with the normal conditions, the contaminant removing effect can be increased by making the voltage applied to the energy element 18 about 20% to 40% higher than the voltage in the normal discharge operation and increasing the vibration frequency 30 kHz to 50 kHz higher than the vibration frequency in the normal discharge operation. The longer the cleaning time by vibration, the higher the effect. The cleaning effect can be further increased by performing the cleaning for several hours to several days.

In step S4 after the cleaning ends, the liquid discharge state of each discharge opening 19 is detected. The detection method is as described above. If a discharge failure is detected, the cleaning step is performed again in step S6. If no discharge failure is detected, the cleaning operation is completed.

Second Embodiment

Figure 7A:
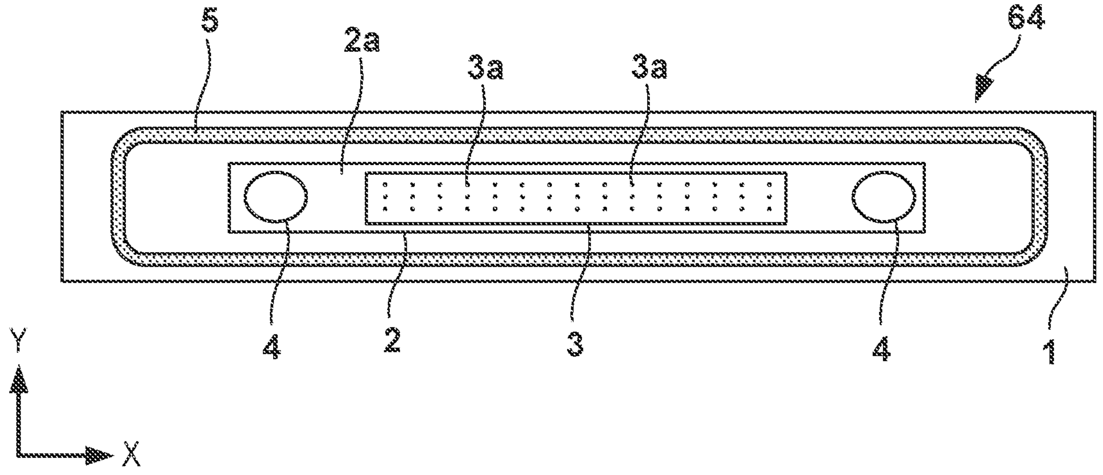
FIGS. 7A and 7B are views each showing another arrangement example of the cap.

Another example of the configurations and arrangements of the supply portion 3 and the outlet portions 4 will be described. FIG. 7A shows an example in which a porous member formed with a large number of pores 3*a* is used as a supply portion 3. The porous member may be a processed product obtained by forming the large number of pores 3*a* in a plate-like member, or may be a member including the large number of pores 3*a* due to the nature of the material such as a porous material.

Figure 7B:
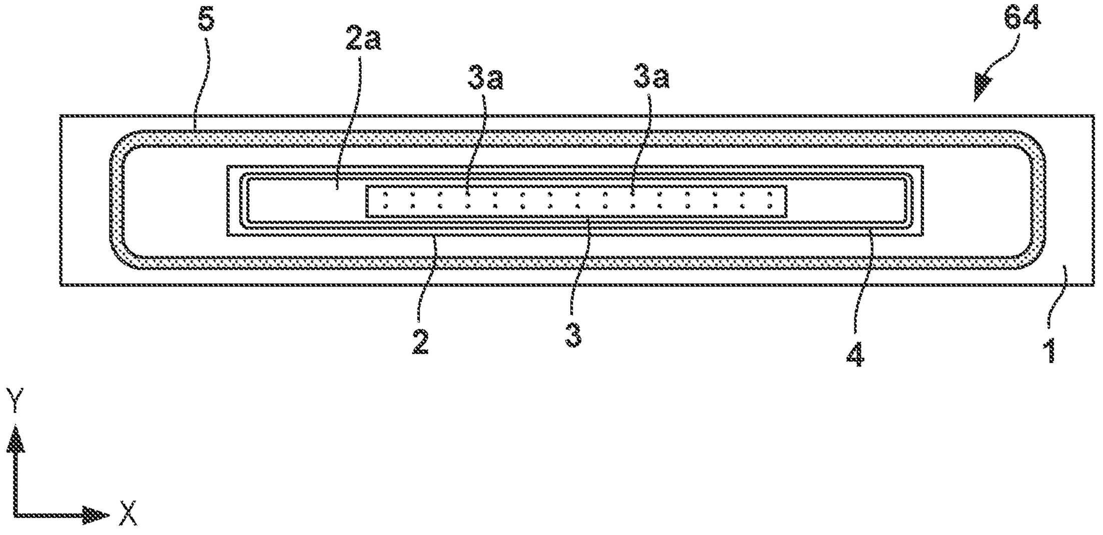

FIG. 7B shows another example. In the example shown FIG. 7B, an outlet portion 4 is formed as an annular opening which is formed so as to surround the supply portion 3. The cleaning liquid from the supply portion 3 further easily spreads radially. In addition, it is possible to prevent a contaminant from flowing together with the cleaning liquid from the outside to the inside in an arbitrary direction of a discharge surface 58. In the example of the outlet portion 4 shown in FIG. 7B, an annular groove may be formed instead of the annular opening, and a part of the groove may communicates with a pipe 63. Further, in the example shown in FIG. 7B, a porous member is used as an example of configuring the supply portion 3 as in FIG. 7A, but the supply portion 3 may be a single opening as in the first embodiment.

Third Embodiment

Figure 8:
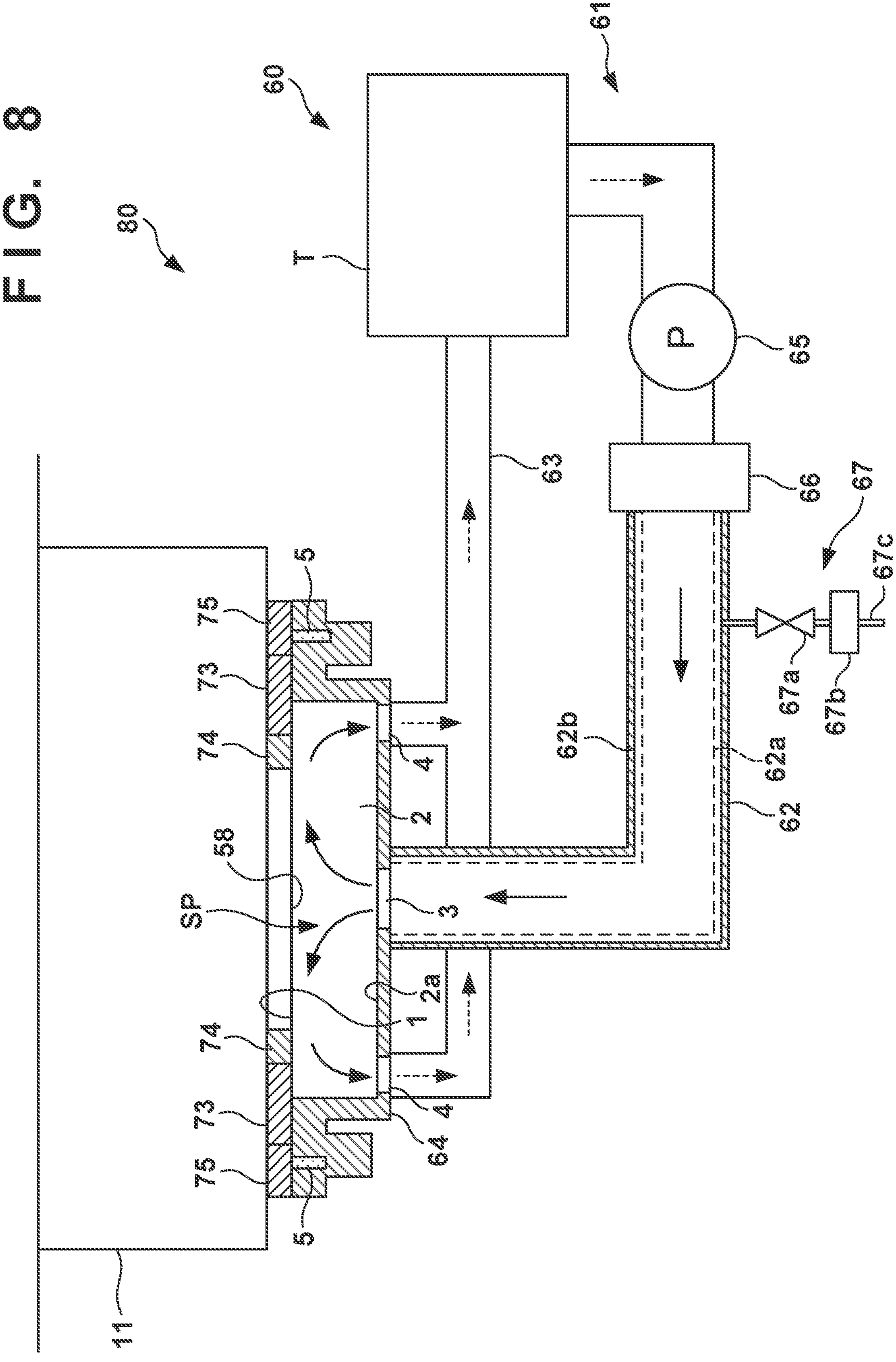
FIG. 8 is a view showing another arrangement example of the cleaning apparatus.

As has been described in the first embodiment, the cleaning effect can be improved by driving each energy element 18 during the cleaning to vibrate the cleaning liquid in the nozzle 54 and the cleaning liquid in the holding space SP. In this case, the cleaning effect can be further improved by deaerating the cleaning liquid. FIG. 8 illustrates a cleaning apparatus 60 provided with a deaeration apparatus 67.

In the example shown in FIG. 8, the cleaning liquid is deaerated in a pipe 62. The pipe 62 has a double-pipe structure formed by an inner pipe 62*a* and an outer pipe 62*b*. The inner pipe 62*a* is formed of a film-like gas transmissive member. The outer pipe 62*b* is a general pipe member but has a strength to withstand a reduced pressure. An exhaust duct 67*c* is connected to the outer pipe 62*b*, and a valve 67*a* and an exhaust apparatus 67*b* such as a pump are connected to the exhaust duct 67*c*.

The pressure in the outer pipe 62*b* is reduced to, for example, about −90 KPa by opening the valve 67*a* and driving the exhaust apparatus 67*b*. With this, the dissolved gas in the cleaning liquid passing through the inner pipe 62*a* moves between the inner pipe 62*a* and the outer pipe 62*b*. Thus, the cleaning liquid can be deaerated. After the pressure is reduced, the valve 67*a* is closed. With this, even when the exhaust apparatus 67*b* is stopped, the reduced pressure state in the outer pipe 62*b* can be maintained.

If a pressure P1 of the cleaning liquid changes due to the reduced pressure in the outer pipe 62*b*, a pressure control unit 13 controls a pressure P2 to maintain the state of the pressure P2>the pressure P1. In this state, a pump 65 is driven to start supply of the cleaning liquid to a holding space SP and circulation of the cleaning liquid. Further, it is possible to increase the cleaning effect by driving energy elements 18 to vibrate the cleaning liquid in the holding space SP.

Note that the inner pipe 62*a* is formed by a gas transmissive member to deaerate the cleaning liquid, but the deaeration method is not limited to this. For example, a groove 2 of a cap 64 is formed to have a double-walled structure, and the inner wall is formed by a gas transmissive member. Then, it is also possible to deaerate the cleaning liquid in the holding space SP by reducing the pressure in the outer wall. In consideration of generation of bubbles in a filter 66, a position between the filter 66 and the cap 64 is advantageous for the deaeration position of the cleaning liquid.

Examples of the gas transmissive member are perfluoroalkoxyalkane (PFA), polytetrafluoroethylene (PTFE), polymethylpentene (PMP), silicon, and the like.

The deaeration may be performed at a timing not in the cleaning time. In addition, if a failure of a discharge opening 19 is detected, the deaeration may be started before cleaning is started. The deaeration may be performed after a predetermined time has elapsed. Further, the deaeration may be performed with a programmed command as a trigger.

Figure 9:
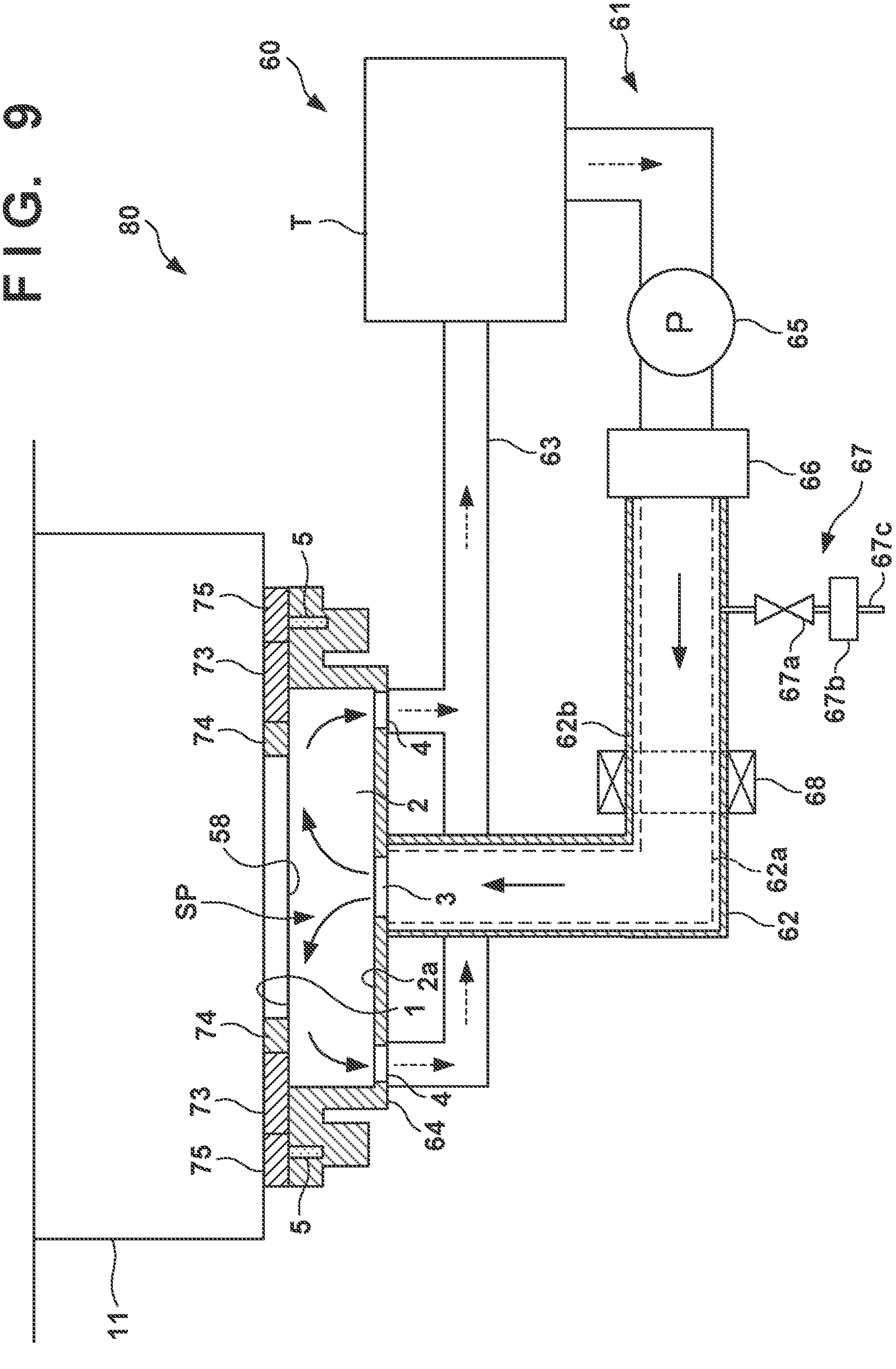
FIG. 9 is a view showing still another arrangement example of the cleaning apparatus.

Next, an example of promoting deaeration by heating the cleaning liquid will be described. FIG. 9 shows the cleaning apparatus 60 according to this embodiment, and a heating apparatus 68 is added to the arrangement example shown in FIG. 8. In general, the higher the liquid temperature, the lower the gas solubility of the liquid. Thus, when the liquid temperature of the cleaning liquid is high, the dissolved gas appears as bubbles. When the liquid temperature of the cleaning liquid is maintained high by the heating apparatus 68, the gas dissolved in the cleaning liquid moves between the inner pipe 62*a* and the outer pipe 62*b* via the inner pipe 62*a* as the gas transmissive member, so that the cleaning liquid can be deaerated. In addition, it is also possible to suppress that a gas is newly dissolved in the cleaning liquid.

In the example shown in FIG. 9, the cleaning liquid is heated by heating the pipe 62 by the heating apparatus 68.

However, the heating part is not limited to this. For example, a tank T, a pipe 63, or a cap 64 may be heated. In any case, by structuring the heating apparatus 68 so as not to come into direct contact with the cleaning liquid, a contaminant from the heating apparatus 68 can be prevented from mixing into the cleaning liquid.

For example, from the viewpoint of the deaeration effect, the heating temperature is maintained at the temperature 5° C. or more higher than normal. The heating temperature may be set in accordance with the physical property of the cleaning liquid. After checking the correlation between the temperature and the discharge accuracy in advance, the liquid temperature of the cleaning liquid may be monitored, and the discharge parameter may be automatically corrected in accordance with the liquid temperature.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-203603, filed Dec. 15, 2021, which is hereby incorporated by reference herein in its entirety.

What is claimed is:

1. A liquid discharge apparatus comprising a discharge head including a discharge surface formed with a plurality of discharge openings from which a liquid is discharged, a cap configured to be detachably attached to the discharge head and form a holding space for a cleaning liquid such that the cleaning liquid contacts the discharge surface, a supply portion configured to connect to the cap and to supply the cleaning liquid to the holding space, and an outlet portion configured to connect to the cap and to drain the cleaning liquid from the holding space, wherein the supply portion is formed at a position facing the discharge surface, the outlet portion is formed at a position outside the supply portion in an inside-outside direction of the discharge surface, and the outlet portion is annularly formed so as to surround the plurality of discharge openings.

2. The apparatus according to claim 1, wherein the supply portion is formed by a porous member.

3. The apparatus according to claim 1, wherein the supply portion is formed at a position facing a central portion of the discharge surface.

4. The apparatus according to claim 3, wherein the outlet portion is formed at a position not facing the discharge surface.

5. The apparatus according to claim 3, wherein the cap includes a facing surface facing the discharge head, a groove formed in the facing surface and defining the holding space, and a seal member provided on the facing surface so as to surround the groove, and the supply portion and the outlet portion are open in a bottom wall surface of the groove.

6. The apparatus according to claim 3, further including a tank configured to store a cleaning liquid, a circulation unit configured to circulate the cleaning liquid between the tank and the holding space via the supply portion and the outlet portion, and a filter provided in the middle of a circulation path of the cleaning liquid.

7. The apparatus according to claim 1, wherein the supply portion is an opening narrower than a width of the discharge surface.

8. The apparatus according to claim 1, wherein the outlet portion is formed at a position not facing the discharge surface.

9. The apparatus according to claim 8, wherein the cap includes a facing surface facing the discharge head, a groove formed in the facing surface and defining the holding space, and a seal member provided on the facing surface so as to surround the groove, and the supply portion and the outlet portion are open in a bottom wall surface of the groove.

10. The apparatus according to claim 8, further including a tank configured to store a cleaning liquid, a circulation unit configured to circulate the cleaning liquid between the tank and the holding space via the supply portion and the outlet portion, and a filter provided in the middle of a circulation path of the cleaning liquid.

11. The apparatus according to claim 1, wherein the cap includes a facing surface facing the discharge head, a groove formed in the facing surface and defining the holding space, and a seal member provided on the facing surface so as to surround the groove, and the supply portion and the outlet portion are open in a bottom wall surface of the groove.

12. The apparatus according to claim 1, further including a tank configured to store a cleaning liquid, a circulation unit configured to circulate the cleaning liquid between the tank and the holding space via the supply portion and the outlet portion, and a filter provided in the middle of a circulation path of the cleaning liquid.

13. The apparatus according to claim 1, further comprising an element provided for each discharge opening, and configured to output a signal corresponding to a liquid discharge state of the discharge opening.

14. The apparatus according to claim 1, further comprising an element provided for each discharge opening, and configured to cause discharge of a liquid from the discharge opening, wherein the element is driven during cleaning using the cleaning liquid.

15. The apparatus according to claim 1, further comprising a deaeration unit configured to deaerate the cleaning liquid.

16. The apparatus according to claim 1, further comprising a heating unit configured to heat the cleaning liquid.

17. An imprint apparatus comprising a liquid discharge apparatus and performing an imprint process for a substrate by discharging a liquid from the liquid discharge apparatus, wherein the liquid discharge apparatus comprises a discharge head including a discharge surface formed with a plurality of discharge openings from which a liquid is discharged, a cap configured to be detachably attached to the discharge head and form a holding space for a cleaning liquid such that the cleaning liquid contacts the discharge surface, a supply portion configured to connect to the cap and to supply the cleaning liquid to the holding space, and an outlet portion configured to connect to the cap and to drain the cleaning liquid from the holding space, wherein the supply portion is formed at a position facing the discharge surface, the outlet portion is formed at a position outside the supply portion in an inside-outside direction of the discharge surface, and the outlet portion is annularly formed so as to surround the plurality of discharge openings.

18. A cleaning method of cleaning, with a cleaning liquid, a plurality of discharge openings of a discharge head of a liquid discharge apparatus, wherein the discharge head includes a discharge surface formed with the plurality of discharge openings from which a liquid is discharged, the liquid discharge apparatus including: a cap configured to be detachably attached to the discharge head and form a holding space for a cleaning liquid such that the cleaning liquid contacts the discharge surface; a supply portion configured to connect to the cap and to supply the cleaning liquid to the holding space, the supply portion being formed at a position facing the discharge surface; and an outlet portion configured to connect to the cap and to drain the cleaning liquid from the holding space, the outlet portion being formed at a position outside the supply portion in an inside-outside direction of the discharge surface, and the outlet portion being annularly formed so as to surround the plurality of discharge openings, the method comprising:

attaching the cap to the discharge head to form a holding space for the cleaning liquid such that the cleaning liquid contacts the discharge surface; and supplying the cleaning liquid to the cap and draining the cleaning liquid from the cap such that the cleaning liquid flows from a central portion to a peripheral portion of the discharge surface.

* * * * *